UNITED STATES PATENT OFFICE.

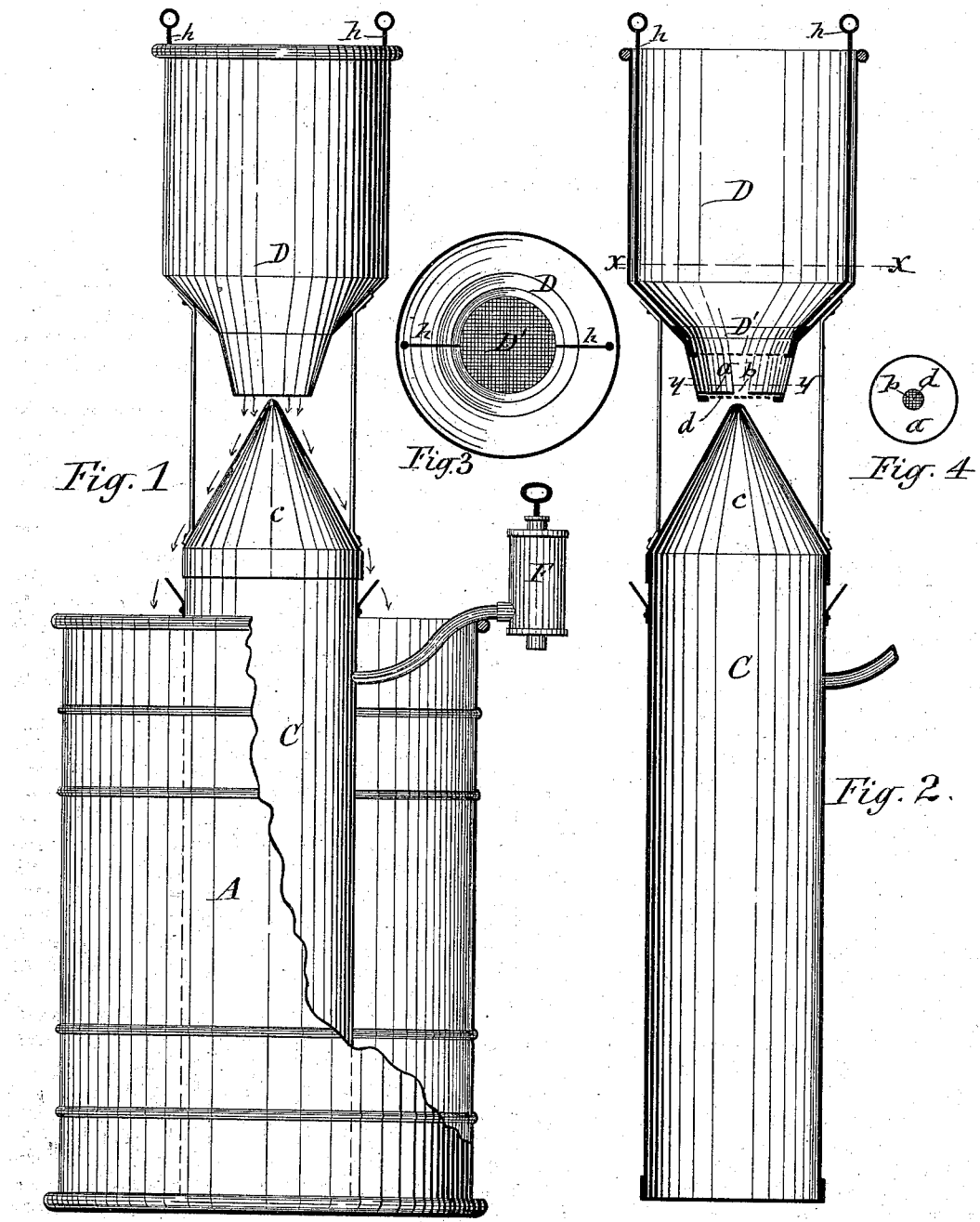

ALBERTIS BOWDISH, OF LOCKE, NEW YORK.

MILK-STRAINER.

SPECIFICATION forming part of Letters Patent No. 385,091, dated June 26, 1888.

Application filed September 30, 1887. Serial No. 251,101. (No model.)

*To all whom it may concern:*

Be it known that I, ALBERTIS BOWDISH, of Locke, in the county of Cayuga, in the State of New York, have invented new and useful Improvements in Milk-Strainers, of which the following, taken in connection with the accompanying drawings, is a full, clear, and exact description.

This invention consists in a novel and simple construction of an apparatus by means of which milk can be quickly and conveniently cooled and freed from animal odor, as hereinafter fully described, and specifically set forth in the claim.

In the annexed drawings, Figure 1 is an elevation of my improved milk-deodorizer, a portion of the milk-can being broken away to better illustrate the arrangement of the cooling-can inside of the milk-can. Fig. 2 is a vertical transverse section of the cooling-tank and strainer; and Figs. 3 and 4 are horizontal transverse sections, respectively, on lines $x$ $x$ and $y$ $y$, Fig. 2.

Similar letters of reference indicate corresponding parts.

A represents a milk-can or analogous receptacle for milk.

C denotes the cooler, consisting of a can of considerably smaller diameter than the milk-can and placed inside thereof and filled with ice or cold water. Said cooling-can rises above the milk-can to obviate the danger of the milk entering the cooling-can. The top of the cooling-can is provided with a removable cover, $c$, which is cone-shaped to act as a diffuser of the milk during its entrance into the can A. Above this cone or diffuser is the strainer D, preferably supported by legs or standards secured at their feet to the cover $c$ and at their upper ends to the strainer-vessel. The straining-diaphragm $d$ is concentric with the axis of the cone, and over said diaphragm, in the strainer D, is a plate, $a$, which is provided with an aperture, $b$, in its center, for the purpose of confining more effectually the egress of the milk to a point central over the apex of the cone C, and in order to maintain the strainer-diaphragm clean as much as possible I arrange above the same an auxiliary strainer, D', seated removably on the inclined inner sides of the funnel-shaped lower portion of the strainer-vessel. To facilitate the removal of the auxiliary strainer D' when required for cleaning the same, I attach thereto vertical handles $h$ $h$, which project above the top of the strainer-vessel.

F represents a pump, which is connected to the upper part of the cooling-can C for the purpose of extracting therefrom excess of water, which may be produced by the melting of the ice.

In operating my improved milk deodorizer and cooler the can C is to be filled with ice or cold water and set into the milk-can A. The cover $c$, being applied to the can C, supports the strainer D in its requisite position. The auxiliary strainer D' is also to be placed in its position in the strainer D. Then by pouring the milk into the strainer it issues from the bottom thereof in a spray over the apex of the cone $c$, and in descending on the flaring side of the cone the milk becomes effectually diffused. The contact of the milk with the cold cover of the cooler C, together with the exposure of the diffused milk with the air around the top of the milk-can, serves to cool the milk and simultaneously expel the animal odor therefrom. The milk passes from the aforesaid diffuser down into the milk-can, where it is further subjected to the cooling influence of the cooling-can C.

Having described my invention, what I claim as new, and desire to secure by Letters Patent, is—

The combination, with the milk-can A, of the cooling-can C, the conical cover $c$ on the top of the cooling-can, the strainer D, supported above the cover $c$, and the plate $a$ in the strainer, provided with the aperture $b$ over the apex of the cone, substantially as described and shown.

In testimony whereof I have hereunto signed my name, in the presence of two witnesses, at Syracuse, in the county of Onondaga, in the State of New York, this 28th day of September, 1887.

ALBERTIS BOWDISH. [L. S.]

Witnesses:
C. H. DUELL,
MARK W. DEARY.